Jan. 16, 1968 W. O. MOORE 3,363,876
PRECAST CONCRETE MANHOLE BASE MOLDING APPARATUS
Filed March 11, 1965 4 Sheets-Sheet 1
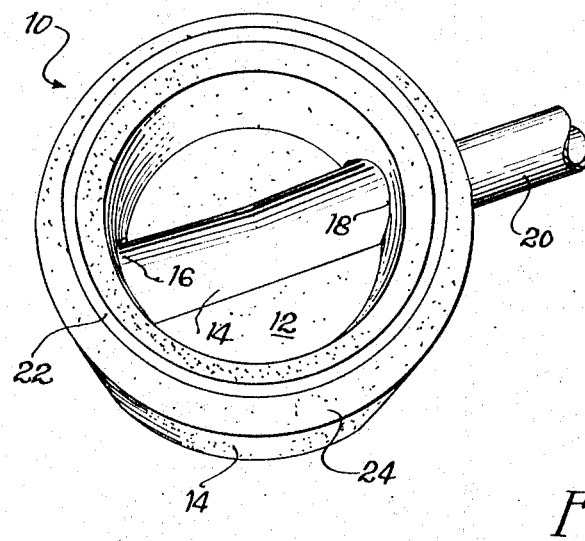
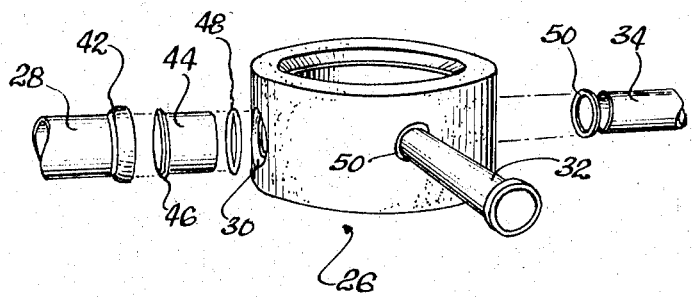
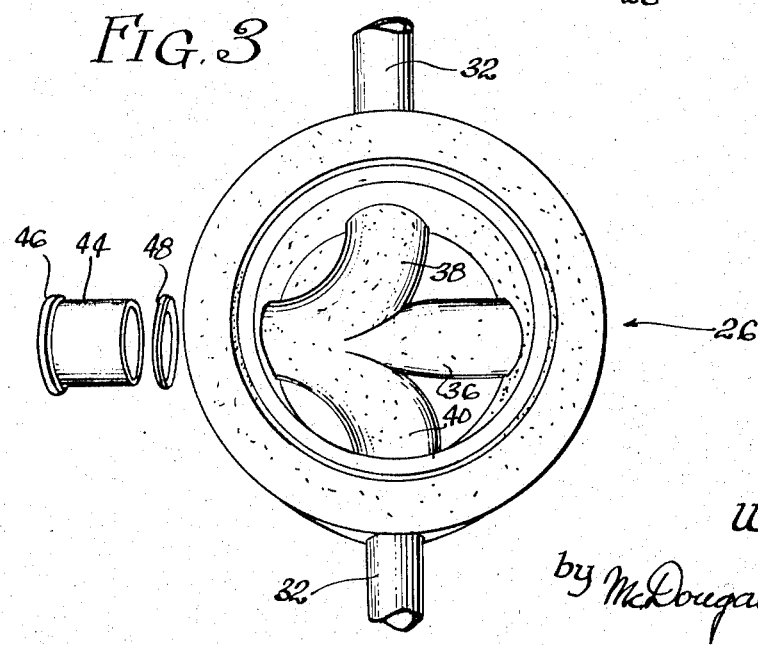
INVENTOR
Wayne O. Moore
by McDougall, Hersh & Scott
Attys Jan. 16, 1968 W. O. MOORE 3,363,876
PRECAST CONCRETE MANHOLE BASE MOLDING APPARATUS
Filed March 11, 1965 4 Sheets-Sheet 2

INVENTOR
Wayne O. Moore
by McDougall, Hersh & Scott
Att'ys

Jan. 16, 1968 W. O. MOORE 3,363,876
PRECAST CONCRETE MANHOLE BASE MOLDING APPARATUS
Filed March 11, 1965 4 Sheets-Sheet 3
FIG. 7
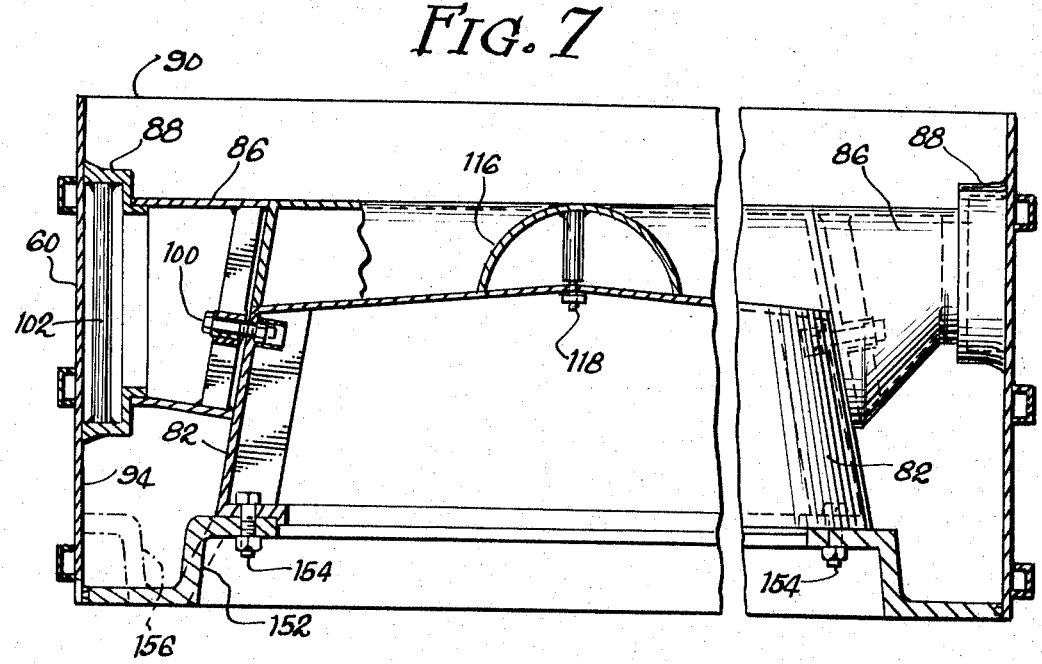
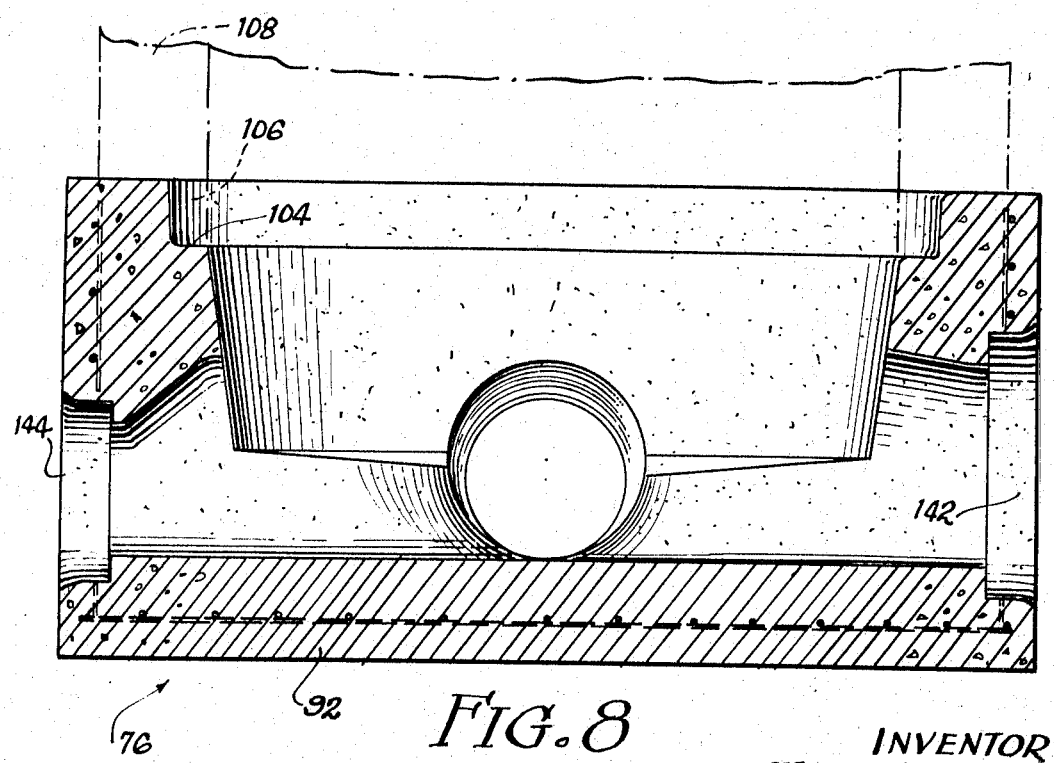
FIG. 8
INVENTOR
Wayne O. Moore
by McDougall, Hersh & Scott
Att'ys Jan. 16, 1968 W. O. MOORE 3,363,876
PRECAST CONCRETE MANHOLE BASE MOLDING APPARATUS
Filed March 11, 1965 4 Sheets-Sheet 4
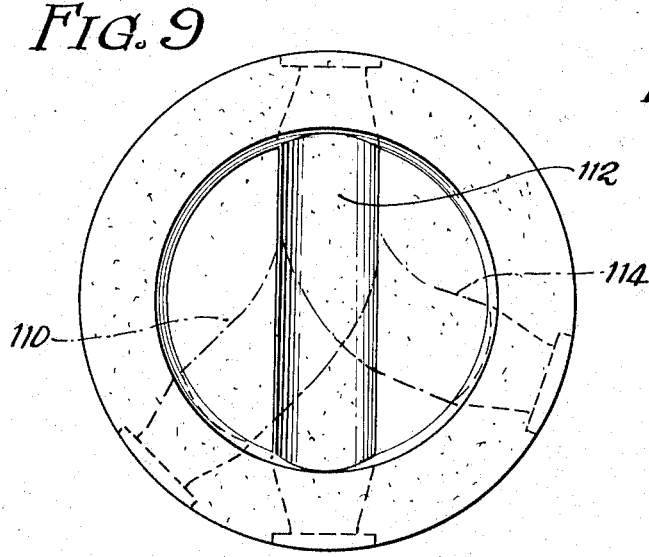
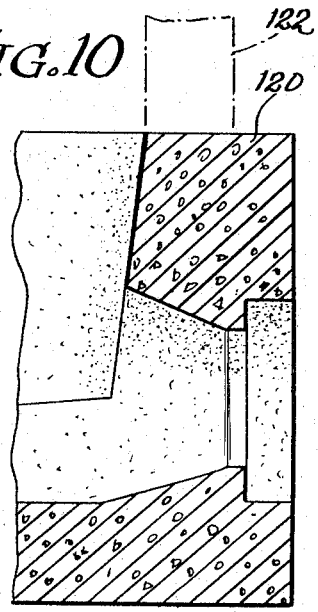
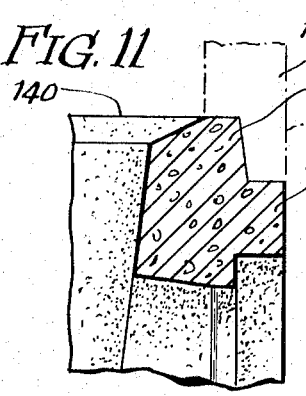
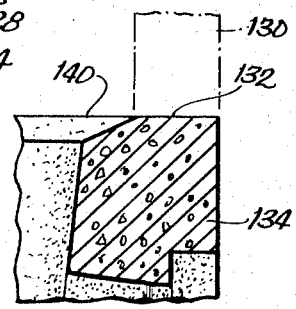
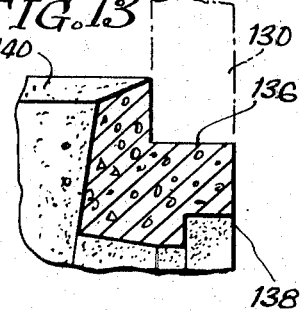
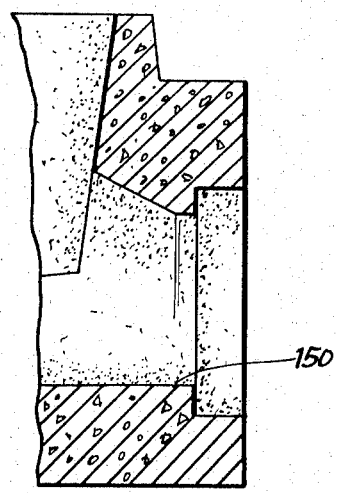
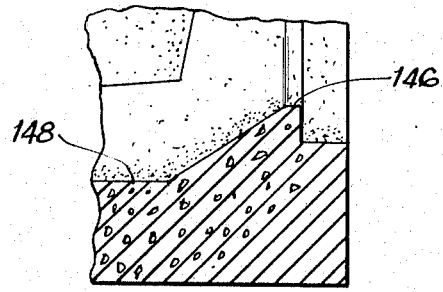
INVENTOR
Wayne O. Moore
by McDougall, Hersh & Scott
Att'ys

United States Patent Office 3,363,876
Patented Jan. 16, 1968

3,363,876
PRECAST CONCRETE MANHOLE BASE
MOLDING APPARATUS
Wayne O. Moore, Box 761, Mount Vernon, Ill. 62864
Filed Mar. 11, 1965, Ser. No. 439,049
5 Claims. (Cl. 249—145)

ABSTRACT OF THE DISCLOSURE

A precast concrete manhole base molding apparatus comprising a molding jacket and a molding form disposed within the jacket. The form includes a central portion having side walls disposed in spaced apart relationship with the interior face of the jacket and a top wall disposed in spaced apart relationship with the top of the jacket. Channel forming members are removably attached to the top wall and inserts removably attached to the side wall and extending outwardly into contact with the jacket. When concrete is poured over the mold form, a manhole base is produced having a channel in its bottom interior surface with passages communicating with the channel and opening through the exterior wall of the base. The passages are in the positions of the inserts removably secured to the mold form.

Specification

This invention relates to constructions which are adapted for use in the formation of manholes. In particular, the invention is concerned with the production of precast manhole bases.

In the building of sewers, it is necessary to provide manholes at spaced intervals to permit access to the sewer line. Such access is necessary to permit cleaning of the sewers and to simplify repairs to some extent.

It is current practice to provide manholes at relatively close intervals along sewer lines, and since virtually every construction project requires a sewer of some sort, there is a need for a large number of manholes. Conventional methods employed for building of manholes have, however, proven undesirable from the standpoint of quality and also from the standpoint of expense due to the fact that current methods are time consuming and require relatively skilled labor.

Conventional manholes are ordinarily built by first pouring concrete into the bottom of an excavation which is located in the sewer line. The concrete, when set, forms the base for a manhole and thereafter the walls can be located over the base through the use of precast cylindrical concrete members. If the precast members are not provided with openings for sewer pipe, it is necessary to break away suitable openings. The process is somewhat simplified by pre-forming openings in the cylindrical members; however, in any case, it is necessary to seal the pipes with respect to the cylindrical members so that the only communication between the interior and the exterior of the manhole wall will be through the sewer pipe. The conventional techniques also often provide for the laying of the sewer pipe completely through the manhole excavation over the base which has been bast in place. After the cylindrical side walls are located with respect to the sewer pipe, the pipe must be broken away in the interior of the manhole to provide the necessary openings for the pipe within the manhole.

The above described conventional techniques as well as other methods currently employed result in relatively high costs in manhole production and are also considered relatively deficient from the standpoint of quality. Insofar as cost is concerned, it is necessary to provide workers qualified for pouring and forming of concrete whereby the base or bottom wall of the manhole will be properly formed. It is also necessary to provide laborers for locating cylindrical walls over the base whereby the manhole can be built up to the desired height. Finally, the laying of thes ewer pipe and the sealing of the pipe with respect to the manhole openings materially add to the labor costs involved.

The quality of manholes of the type described is often deficient and it is difficult to provide uniform quality even in a single construction project. Thus, the individual manholes depend for their quality on the skill and care of the workment involved. Even with the most highly skilled workers, the manholes may not be properly formed due to conditions which prevail in the location of the manholes. For example, if the area is relatively wet, it is often very difficult to provide for proper setting of concrete in the formation of the manhole base. Where wet conditions prevail, it is also very difficult to provide for proper sealing of the sewer pipe with respect to the manhole walls.

It is a general object of this invention to provide a mold apparatus for manhole constructions which include precast manhole bases whereby difficulties encountered in the formation of manholes can be largely eliminated and whereby the expense of manhole construction can be materially reduced.

It is a further object of this invention to provide a unique mold apparatus for the formation of manhole bases whereby the bases can be precast in a highly economical and efficient manner.

It is a still further object of this invention to provide apparatus for molding manhole bases which can be precast in a wide variety of configurations whereby the bases can be employed under any conditions necessary in the construction of sewers.

It is a still further object of this invention to provide a molding apparatus which is employed in the formation of manhole bases whereby essentially the same system can be employed in the formation of a wide variety of manhole base designs and sizes to thereby provide great efficiency and economy in construction.

It is an additional object of this invention to provide apparatus for molding manhole bases of the type described which are uniquely suitable for association with sewer pipes of any conventional size whereby a highly effective seal can be formed between the pipes and the manhole without the necessity for separate sealing operations to thereby greatly reduce the labor costs involved in producing manholes while at the same time providing high quality manholes in a completely consistent fashion.

These and other objects of this invention will appear hereinafter and for purposes of illustration, but not of limitation, specific embodiments of this invention are shown in the accompanying drawings in which:

FIGURE 1 is a perspective view of a manhole base produced in accordance with this invention;

FIGURE 2 is a perspective view of a manhole base of the type described illustrating the manner in which sewer pipes are associated therewith;

FIGURE 3 is a plan view of a manhole base illustrating an alternative channel pattern adapted to be formed by the techniques of this invention;

FIGURE 7 is a vertical sectional view of the mold form and jacket shown in FIGURE 6;

FIGURE 8 is a vertical sectional view of the precast manhole base illustrated in FIGURE 3 and produced with the mold assembly of FIGURE 7;

FIGURE 9 is a plan view of an alternative form of a precast manhole base produced in accordance with this invention; and, FIGURES 10 through 15 comprise fragmentary sectional views illustrating alternative designs for precast manhole bases adapted to be produced by the techniques of this invention.

Figure 4:
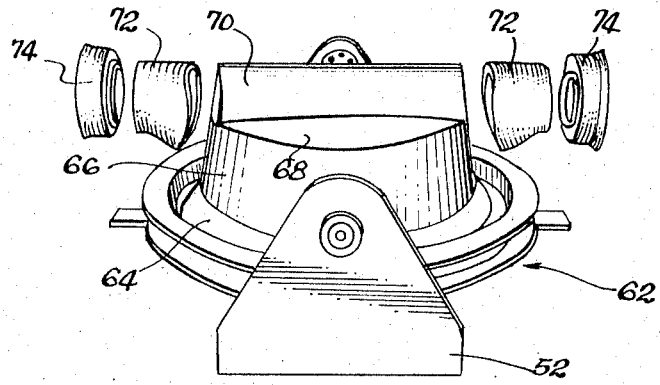
FIGURE 4 is a perspective view illustrating a mold form employed in the construction of the manhole bases of this invention.

The precast manhole base made by the molding apparatus of this invention generally comprises a bottom wall having associated therewith an enclosed upstanding side wall which is integrally cast with the bottom wall. Openings are defined in the side wall whereby sewer pipes can be attached to the base for the passage of sewage through the manhole. In the preferred form of the invention, channels are defined by the bottom wall for directing the sewage along a particular path.

The manhole bases covered by the instant invention can assume a wide variety of configurations. In many instances, a manhole will be included in a direct line whereby a linear flow-through channel and openings in the opposite side walls of the base will be provided. In other instances, a manhole is located at the juncture of two or more sewer lines and in such instances, a plurality of channels are provided, depending upon the number of lines involved. Finally, a manhole may be located in the main line of a sewer with branch lines feeding into the manhole and, in such instances, large diameter openings are associated in the same base with smaller diameter openings. The system of the instant invention is adapted for the production of any of these variations in sewer constructions and for the production of many other variations which will be obvious to those skilled in the art.

The apparatus referred to is relatively simple in construction and is capable of providing the cast bases even when handled by relatively unskilled personnel. A further distinct feature of the apparatus to be described resides in the suitability of the apparatus for use in the formation of a wide variety of different base designs with only relatively simple modifications in the construction being required.

FIGURE 1 of the drawings illustrates a manhole base 10 which includes a bottom wall 12 and an upstanding annular side wall 14. A channel 14 defining a semicylindrical shape is formed in the bottom wall. Openings 16 and 18 are defined by the side wall 14 to provide for flow of sewage or the like through the manhole. A sewer pipe 20 communicates with the opening 18 and a similar pipe is adapted to be connected at the opening 16.

The base member 10 defines an annular flange portion 22 which extends upwardly from the top edge 24 of the side wall 14. This flange portion serves as a guide member for the proper location of a concrete cylindrical riser. These risers are preferably precast members, and any number can be located in series depending upon the desired depth of the manhole. Where a base of the type shown in FIGURE 1 is employed, the riser may comprise a member having an interior diameter slightly larger than the exterior diameter of the flange 22 whereby the riser will fit around the flange and rest on the top edge 24.

The manhole base 26 shown in FIGURE 2 is also provided with bottom and side walls as described with reference to FIGURE 1. In this instance, however, additional openings are provided whereby a large sewer pipe 28 can be connected to the base through the opening 30 while smaller sewer pipes 32 and 34 can be attached at smaller diameter openings. A design of this nature is desirable where branch lines feed into a main line with the juncture being located at the manhole.

FIGURE 3 illustrates a plan view of the base 26. In this instance, the bottom wall of the base defines a straight through channel 36 and side channels 38 and 40. The pipes 32 representing branch line connections are thus adapted to feed into the main line with the flow being directed in the desired fashion.

FIGURES 2 and 3 also illustrate the manner in which the sewer pipes are preferably associated with the manhole bases of this invention. The pipe 28 includes a bell-shaped end 42, and an outlet joint member 44 is adapted to fit into the end 42. A plastic adaptor ring 46 is molded to the pipe member 44 whereby the connection with the pipe end 42 will be tight thereby providing the desired sealing relationship. A similar adaptor ring 48 is located around the other end of the joint member 44 for sealing relationship of this joint and with the opening 30.

It will be appreciated that various conventional adaptor rings of plastic and related materials are suitable for the purposes of this invention. Suitable rings are manufactured by National Coupling Company Incorporated, Fort Wayne, Ind., and W. S. Dickey Clay Mfg. Co., Birmingham, Ala. The use of the plastic coupling members is particularly suitable since the use of such rings facilitates operations wherein clay pipe is employed. Concrete, asbestos, cement, and cast iron pipe are, however, all suited for use in applying the concepts of this invention.

Connection of the sewer pipes can also be accomplished in the manner shown in FIGURE 2 wherein a plastic adaptor ring 50 is fit around the pipes 32 and 34. When these pipes are forced into their respective openings, a sealing relationship can readily be achieved. It will be appreciated that additional sealing can be accomplished by the use of conventional sealing compounds at these points; however, the system described employing plastic rings is considered fully suitable for sewer operations. In this connection, it will be noted that the use of a joint member 44 is highly desirable since these members can be cut to any desired length whereby pipes 28 of conventional sizes can be employed with the joints 44 being utilized to span any distances between the end of the last pipe and the opening in the manhole base.

An important aspect of the instant invention relates to the manner in which the base constructions are manufactured. FIGURES 4 through 7 illustrate the details of the preferred molding mechanisms for use in the practice of this invention.

The mold construction illustrated includes a cradle member 52 which includes a horizontal bed 54 and upstanding ends 56. A mold form member is adapted to rest on the bed 54 and a mold jacket 60 is provided for enclosing the mold form.

Figure 5:
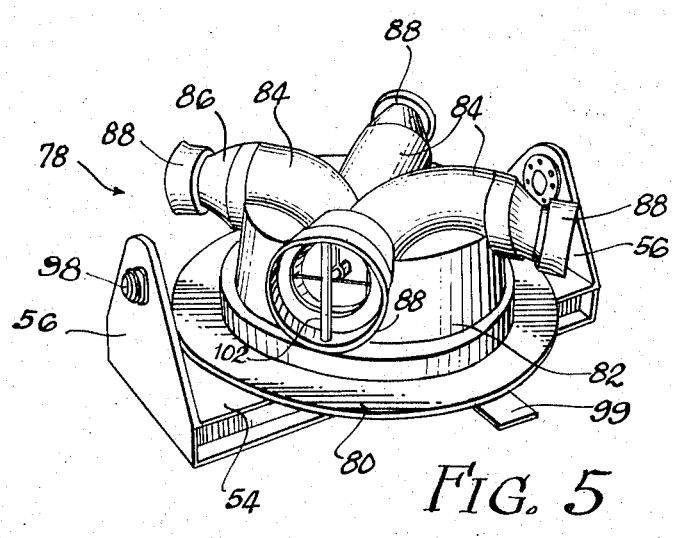
FIGURE 5 is a perspective view illustrating a mold form utilized in the construction of an alternative design for a manhole base.
Figure 6:
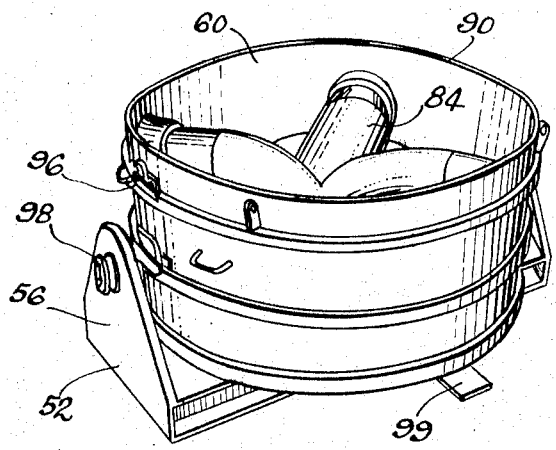
FIGURE 6 is a perspective view illustrating the mold form of FIGURE 5 with the mold jacket associated therewith.

The mold form 62 shown in FIGURE 4 comprises a base portion 64 and a central portion 66 which extends upwardly from the base. The top wall 68 of the portion 66 defines a semicylindrical member 70, and insert members 72 and 74 are adapted to be connected to the mold form. FIGURES 5 through 7 illustrate the mechanisms necessary for producing a particular type of molded base 76 shown in FIGURE 8. The mold form 78 employed for producing this base includes a base portion 80 and an upstanding central portion 82. Members 84 defined by the top wall of the portion 82 are semicylindrical in shape to provide for the formation of channels in the final product. Removable inserts 86 and 88 are associated with each of the members 84 whereby openings can be formed for communicating with each of the channels.

When a jacket 60 is placed around the mold form, the construction assumes the condition shown in FIGURES 6 and 7. Concrete is adapted to be poured into the mold when in this condition, and the concrete fills the mold to approximately the top edge 90 of the jacket. The area between the top edge of the jacket and the top wall of the mold portion 82 defines the extent of the bottom wall 92 of the precast base 76. The side walls of the base are formed between the interior face 94 of the jacket 60 and the face of the portion 82 of the mold form. It will be noted that the inserts 88 abut directly against the interior face of the mold jacket whereby openings will necessarily be defined in the side walls of the precast base.

The method of formation of the manhole base represents a still further significant aspect of the instant invention. In the preferred operation, the concrete is poured into the mold while the mold is situated on the cradle 52 in the manner shown in FIGURE 6. Concrete is allowed to set to the extent that it will be self-sustaining while still being in the green state. At this point, the jacket 60 is removed, and in this connection, the jacket preferably comprises a two-part assembly having latches located at 96 for ease of removal of the jacket. Any suitable jacket construction is, however, contemplated since this particular mechanical arrangement does not constitute a critical aspect of the instant invention.

It will be noted that the members 56 of the cradle 52 carry spools 98, and these spools are provided to permit hoisting of the cradle. Cables and appropriate hoist means are employed for this purpose, and the cradle is lifted to the extent that it can be tilted through 180°. Handles 99 are provided to facilitate the tilting operation. At this point, the inserts and mold form are removed from the construction. As best shown in FIGURE 7, the inserts 86 are attached to the portion 82 of the mold form by means of bolts 100. The inserts 88 are friction fit within the inserts 86, and a handle 102 is carried by the inserts 88 to facilitate their removal.

Removal of the mold form is accomplished by simply lifting the mold form out of the base after which the inserts 86 can be pulled inwardly and upwardly for removal. The inserts 88 are pulled outwardly, and it will be noted that the tapers of the respective members are all formed to simplify these removal operations.

The manhole base 76 shown in FIGURE 8 defines a top edge which differs from the edge of the base shown in FIGURE 1. In this instance, an annular shoulder 104 is defined by the base, and this shoulder serves as a supporting surface for a flange 106 formed in a riser 108 which rests on top of the manhole base. FIGURES 9 through 15 illustrate various other alternative designs which can be readily produced with the constructions of this invention. In FIGURE 9, alternative forms for flow-through channels in a manhole base are illustrated. The channels 110, 112 and 114 can be alternatively included in a manhole base or all of the channels could be associated with a single base. It will be appreciated that this illustration is provided solely as an indication of the variety contemplated by the instant invention. The location of the flow-through channels is entirely dependent upon the manner in which the semicylindrical members are located on top of the portion 82 of the mold form. These semicylindrical members can be welded in place to provide a permanent mold form; however, it is also contemplated that the members could be removably associated with the mold form as illustrated by the member 116 which is attached to the mold form by means of bolt 118. It should also be appreciated that the concepts of this invention are applicable to the production of manhole bases which do not include flow-through channels although these channels are included in the preferred forms of the invention.

In FIGURE 10, the manhole base includes a flat top edge 120 which will accommodate a riser 122 defining a flat bottom edge. The base 124 of FIGURE 11 corresponds generally to the base 10 of FIGURE 1 wherein a flange portion 22 accommodates a riser 126 which defines a flange 128 on its outer periphery.

FIGURES 12 and 13 provide alternative means for supporting a riser 130 defining a flat bottom edge. The riser may rest on a flat top edge 132 of the manhole base 134 or on the annular shoulder 136 of the manhole base 138. It will be noted that the manhole bases of FIGURES 11, 12 and 13 define bevel portions 140 which can be provided by appropriate designs for a bottom wall of the mold form. These bevels are sometimes preferred to eliminate sharp breaks in the completed product.

FIGURES 10 through 15 also illustrate the wide variety of openings for pipes which can be provided by the techniques of this invention. As previously indicated, it is preferred to provide connections between sewer pipes through the use of plastic sealing rings, and in such a case, it is desirable to have accurately dimensioned openings in the precast manhole bases. The diameters of the openings can be varied between large and small diameters as suggested by the openings 142 and 144 shown in FIGURE 8. Furthermore, the various inserts permit the manufacturer to control the drop between the respective openings in a manhole. In FIGURE 15, a significant drop between the opening 146 and the lowermost point 148 of the channel is provided. In the case of the opening 150 in FIGURE 14, the channel is approximately in line with the opening and, if the openings 146 and 150 were both associated with the same manhole base, there would be a preferential flow through the opening 150.

It will be appreciated that the techniques described provide a highly efficient system for the production of essentially custom cast manhole bases. Specifications for manholes vary widely, and the ability to custom cast in the manner described provides many significant advantages. Since the constructions of this invention are adapted to accommodate a wide variety of different inserts and other elements, and since these elements can be included in the construction in a simple manner, it is obvious that great efficiencies can be achieved in producing the manhole bases. The variety of the inserts employed and the manner in which they are attached to the mold form permit the construction of precast bases in an essentially production line fashion, and the workmen involved need not be particularly skilled to provide a particular design. A plurality of mold forms can be employed for accommodating various channel arrangements, and with such an inventory, the channel forming members can be permanently connected to the mold form. Where these members are removable, the various varieties can be achieved without any essential changes in the mold forms.

It is also to be noted that the mold base member 152 is removably attached to the mold form by means of bolts 154. The changeability of this base member permits the formation of the top edge of the manhole base in a variety of ways. As illustrated in dotted lines in FIGURE 7, this bottom member can include an annular shoulder portion 156 to provide a top edge configuration of the type shown in FIGURE 11. Obviously, such shoulders can be eliminated altogether where a riser defines a flat bottom edge as shown in FIGURE 10. In addition, this flat configuration is desirable where the upper portions of the manhole are to be formed by means of bricks or blocks.

In the above description, reference has been made to the use of concrete in forming the manhole bases; however, it will be appreciated that this term is employed in the generic sense to include equivalent compositions adapted to be utilized in the formation of cast structures of the type described. Furthermore, references to sewer constructions in the specification and claims should be broadly construed to cover constructions designed for the passage of materials through pipes or the like wherein manholes are employed to provide access to the lines.

It will be understood that various changes and modifications may be made in the systems above described which provide the characteristics of this invention without departing from the spirit thereof particularly as defined in the following claims.

That which is claimed is:

1. A precast concrete manhole base molding apparatus comprising a mold jacket defining walls having interior dimensions corresponding to the dimensions of the exterior walls of said base, a mold form disposed within said jacket, said form comprising a base portion extending to the interior face of said jacket, a central portion extending upwardly from said base portion in spaced apart relationship with respect to said interior face of said jacket, and a top surface portion, said top surface portion extending short of the vertical extent of the top edge defined by the wall of said jacket, the side walls of said manhole base being formed in the space between said jacket and the central portion of said form and the bottom wall of said manhole base being formed in the space between said top surface portion and the top edge of said jacket wall, channel forming members extending upwardly from said top surface portion short of the extent of said top edge to provide for the formation of channels in the bottom walls of manhole bases, insert members extending outwardly from the central portion of said form into abutting relationship with said jacket to provide for the formation of openings in the bases formed in the apparatus, said insert members being positioned in line with said channel forming members whereby said openings will be in direct communication with said channels, and wherein said insert members comprise removable inserts whereby a plurality of inserts can be associated in said construction for varying the size of said openings and for varying the drop relationship between respective openings and the bottom wall, wherein said insert members each include a pair of inserts comprising an inner insert and an outer insert, means for removably securing the inner insert to said central portion and means for removably securing the outer insert to said inner insert, said outer insert comprising a larger diameter member adapted to form a recessed opening in the manhole base for receiving the end of a pipe to be associated with the base.

2. An apparatus in accordance with claim 1 wherein said channel forming members are removably attached to said top surface portion.

3. An apparatus in accordance with claim 1 wherein said insert members comprise a first set of members of relatively large diameter to provide an opening in the base for connection with a main sewer line, and at least one additional set of members having a smaller diameter to provide an opening in the base for connection with a branch sewer line.

4. An apparatus in accordance with claim 1 wherein the inner inserts are flared providing a larger diameter adjacent the mold form and a smaller diameter outwardly thereof, and wherein the outer inserts are flared providing a smaller diameter adjacent the connection with the inner insert and a larger diameter outwardly thereof.

5. An apparatus in accordance with claim 1 wherein said base portion is removably connected to said central portion whereby base portions of different design can be associated with the central portion to thereby vary the configuration of the top edge of manhole bases produced in the construction.

References Cited

UNITED STATES PATENTS

| | | | |
|---|---|---|---|
| 941,139 | 11/1909 | Galasse | 249—144 XR |
| 975,525 | 11/1910 | Harshbarger | 249—184 |
| 1,531,569 | 3/1925 | Rade | 249—142 |
| 1,567,234 | 12/1925 | Brucker | 249—142 XR |
| 1,658,836 | 2/1928 | Daniels et al. | 249—142 XR |
| 1,720,503 | 7/1929 | Wickey | 249—144 XR |
| 1,957,027 | 5/1934 | Lasley | 249—144 XR |
| 2,148,189 | 2/1939 | Curran | 249—142 XR |
| 2,583,626 | 1/1952 | Buell | 249—142 XR |
| 2,623,259 | 12/1952 | Schuh | 249—145 XR |
| 2,777,185 | 1/1957 | Wehrung | 249—145 |
| 2,809,414 | 10/1957 | Mitchell. | |
| 2,955,341 | 10/1960 | Sinclair | 249—96 XR |
| 3,136,024 | 6/1964 | Monica | 249—144 XR |

FOREIGN PATENTS

| | | |
|---|---|---|
| 516,878 | 9/1955 | Canada. |

J. HOWARD FLINT, JR., *Primary Examiner.*